Feb. 15, 1966  G. WINTRISS  3,235,223
DISC VALVE WITH MAGNETIC OPERATION
Filed Oct. 24, 1962  2 Sheets-Sheet 1

INVENTOR
George Wintriss
BY Emery, Whittemore
Sandoe & Graham
ATTORNEYS.

Feb. 15, 1966  G. WINTRISS  3,235,223
DISC VALVE WITH MAGNETIC OPERATION
Filed Oct. 24, 1962  2 Sheets-Sheet 2

INVENTOR
George Wintriss
BY Emery, Whittemore,
Sanford & Graham
ATTORNEYS.

3,235,223
DISC VALVE WITH MAGNETIC OPERATION
George Wintriss, Carversville, Pa.
Filed Oct. 24, 1962, Ser. No. 232,795
2 Claims. (Cl. 251—141)

This invention relates to valves and more especially to magnetically operated valves.

It is an object of this invention to provide an improved valve which is self-energizing in at least one direction; which is unaffected by the pressure and which requires no springs. Another object is to provide an improved valve which forms a permanent seal and which is self-compensating and requires very low actuating power.

One advantage of the invention is that the construction can be made of small size and is one which can be made in miniature sizes so small as to physically fit within a housing of the type used for micro switches.

The invention has no external moving parts and the actuating system is therefore independent of and not contacted by the medium which the valve controls. Another advantage is that the actuating system operates without wear and the body design permits use of non-metallic high temperature material for the construction.

Another object of the invention is to provide a valve assembly which is of low cost and suitable for disposable combinations. A single magnetic actuator can trip several of the valves of this invention in timed sequence.

Other objects, features and advantages of the invention will appear or be pointed out as the description proceeds.

In the drawing, forming a part hereof, in which like reference characters indicate corresponding parts in all the views.

Figure 1:
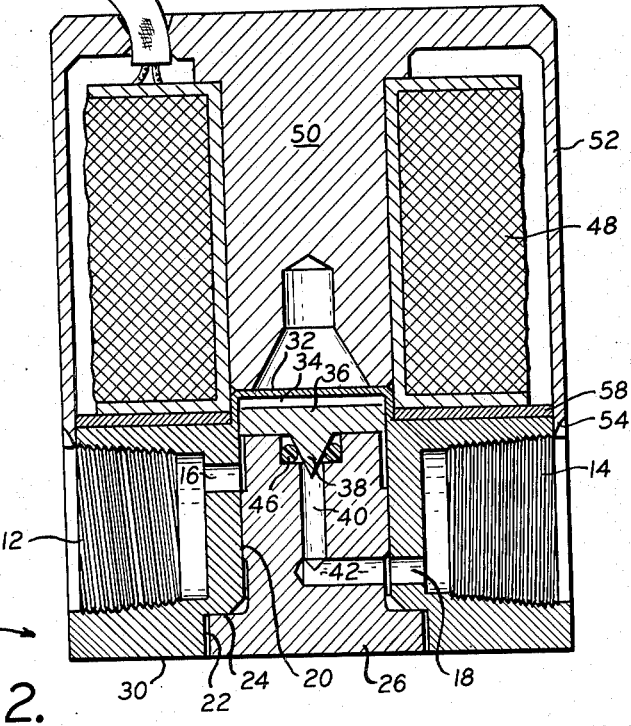
FIGURE 1 is a sectional view showing a magnetically operated valve made in accordance with this invention.
Figure 2:
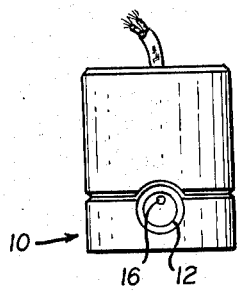
FIGURE 2 is a side elevation, on a reduced scale, of the valve assembly shown in FIGURE 1.

FIGURE 1 shows a valve construction which includes a housing 10 having an inlet port 12 on one side and outlet port 14 on the other side. These ports are threaded and provided with the conventional tapered pipe threads. Each of the ports 12 and 14 has an end wall with a smaller port for communication with the valve chamber. The end wall of the port 12 has a small inlet port 16 and the end wall of the outlet port 14 has a small outlet port 18 which is at a different level from the inlet port 16.

The housing 10 has a center bore 20 and the ports 16 and 18 open through the side walls that surround the bore 20. There is a counter bore 22 at the lower end of the housing 10 and the counter bore ends in a shoulder 24.

A plug 26 fits into the bore 20. In the preferred construction, the plug 26 fits with a press fit and is pushed into the bore 20 until an enlarged lower end of the plug 26 abuts against the shoulder 24. When in this position, the bottom face of the plug 26 is substantially flush with a bottom face 30 of the housing 10.

The upper end of the bore 20 is closed by a wall 32; and the plug 26 is not as long as the bore 20. Thus there is a space between the upper end of the plug 26 and the end wall 32. This space provides a valve chamber 34. The end wall 32 is preferably imperforate. This is practical because of the fact that the invention operates with no moving parts extending from the chamber 34.

A valve element 36 is enclosed in the chamber 34. This valve element is a disc and in the construction illustrated there is a projection 38 on the bottom of the disc extending into an outlet passage 40 which is drilled downwardly into the plug 26 along the axis of the plug. A cross passage 42 is drilled through one side of the plug 26 into communication with the passage 40.

The diameter of the plug 26, at the region of the passage 42, is somewhat smaller than the diameter of the bore 20. This provides an annular passage around the plug 26 so that it is not necessary for the passage 42 to register with the outlet port 18. If the plug is inserted into the bore 20 in a position which locates the passage 42 at an angular spacing from the outlet port 18, fluid can flow from the passage 42, around the clearance provided by the reduced diameter of the plug 26, and cut through the port 18.

The upper end of the plug 26 at the level of the inlet port 16 and for the length of the plug 26 above the inlet port 16 is of reduced diameter and this clearance provided by the reduced diameter provides an annular inlet passage for the flow of fluid from the inlet port 16 to the valve chamber 34. The valve element 36 has a cross section which is similar to that of the chamber 34; but the diameter of the valve element 36 is slightly smaller than the diameter of the chamber 34 so that there is clearance around the circumference of the valve element 36 for the flow of fluid into the part of the chamber 34 which is above the valve element 36.

The valve element 36 contacts with an O-ring 46 located in a counter bore at the upper end of the passage 40. It will be evident that other means for sealing the passage can be used.

The actuator for the valve element 36 is an electro magnet comprising windings 48 on a core 50 which is preferably an integral part of an upper housing 52. This upper housing 52 has a skirt 54 at its lower end which fits over the top portion of the housing 10; this housing 10 having a reduced diameter part at its upper end for fitting into the skirt 54.

A steel disc 58 is located under the windings 48 in position to support the windings from the housing 10 and to control the flux passed from the windings 48 to the valve element 36. In the construction illustrated, the core 50 and the upper housing 52 are made of ferrous metal, and so is the valve element 36. The other parts of the valve assembly are preferably made of non-magnetic material. Aluminum is a suitable material, and plastic may be used instead of metal if desired.

When the windings 48 are not energized, the valve element 36 remains in the closed position shown in FIGURE 1. The pressure from the inlet port 16 is higher than the downstream pressure at the passage 40 and this pressure differential on opposite sides of the valve element 36 holds the valve element in closed position. When the valve element 36 is to be moved into open position, the windings 48 are energized, and the magnetic attraction moves the valve element 36 toward the core 50. As the valve element 36 moves upwardly, the fluid in the chamber 34 above the valve element flows downwardly through the clearance between the valve element 36 and the side wall of the chamber 34.

When the valve element 36 is open, and it is desired to close the valve, the supply of energy to the windings 48 is shut off, and the valve 36 will then close by a self energizing action which results from the fact that there is a pressure drop from the annular inlet around the upper end of the plug 26 to the outlet passage 40, whereas there is no pressure drop across the top space of the valve element 36. Therefore, as pressure builds up in the chamber 34 above the valve element 36, there is a differential between the upper and lower surfaces of the valve element, and this pressure differential moves the valve element 36 downwardly toward the closed position. As the valve element approaches closed position, the pressure drop below the valve element increases because of the reduction in the clearance between the valve element and the top of the plug 26, and this further increases the differential for moving the valve element toward closed position.

Figures 3, 4:
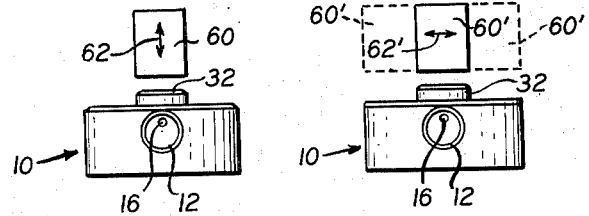
FIGURE 3 is a view showing a valve such as illustrated in FIGURE 1, but with different operating mechanism.
FIGURE 4 is a view similar to FIGURE 3 but showing the magnetic actuator movable in a different direction.

FIGURE 3 shows a modified construction in which the upper housing 52 is removed and there is a permanent magnet 60 loctaed above the top wall 32 of the housing 10. This magnet 60 is moved up and down, as indicated by the double headed arrow 62. When the magnet 60 approaches close to the top wall 36 above the valve element, the valve element is attracted towards the top wall to open the valve in the same way as when the windings 48 were energized in FIGURE 1. When the magnet 60 is moved upwardly away from the top wall 36, the magnetic flux becomes progressively weaker until the attraction of the magnet 60 is no longer strong enough to hold the valve in open position.

FIGURE 4 shows a construction similar to FIGURE 3 except that it has a magnet 60' which moves parallel to the top wall 32 as indicated by the double headed arrow 62'. This magnet 60' can move in either direction as indicated by the dotted line positions. In either of the dotted line positions, the magnet 60' no longer exerts sufficient force to hold the valve open.

Figure 5:
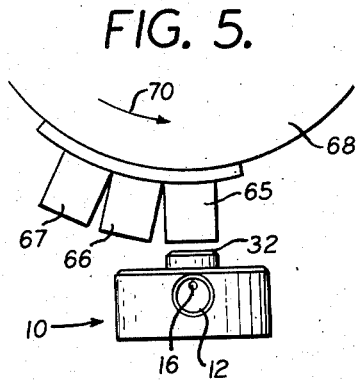
FIGURE 5 is a view similar to FIGURES 3 and 4 but showing still another actuator for the valve.

FIGURE 5 shows another combination for actuating the valve element in the housing 10. In this figure there are permanent magnets 65, 66 and 67 attached to a wheel 68 which is shown as turning counterclockwise as indicated by the arrow 70. As each of the magnets 65 passes close to the top wall 36 of the housing 10, the valve element in the housing 10 is attracted by the magnet to open position. By having the magnets 65, 66, and 67 close together, the attraction for holding the valve element open persists until all three of the magnets 65, 66 and 67 have passed across the top wall 32. Thus the timing of the opening of the valve in the housing 10 can be controlled by correlating the rotation of the wheel 68 with whatever operation requires the opening of the valve in the housing 10. The length of time that the valve remains open depends upon the speed of rotation of the wheel 68 and also on the number of magnets 65, 66 and 67 which are located side by side along the circumference of the wheel 68.

Figure 6:
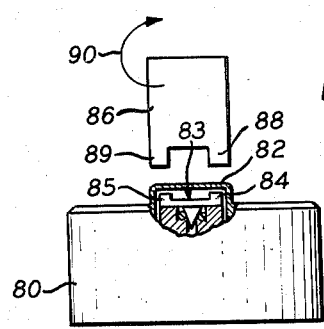
FIGURE 6 is a view partly in section, showing a modified construction in which the valve element is polarized and operated by rotation of a magnetic actuator.

FIGURE 6 shows a modified construction which includes a housing 80 having a valve chamber with a top wall 82 that corresponds to the top wall 32 of the other figures. The only essential difference between the construction shown in FIGURE 6, and that already described in connection with the other figures, is that the housing 80 contains a valve element 83 which is itself a magnet and which is shown with opposite poles 84 and 85. This valve element 83 is actuated by a permanent magnet 86 which has opposite poles 88 and 89 with substantially the same spacing as the poles 84 and 85 of the valve element 83.

If the poles 84 and 88 are opposite polarity, then the poles 85 and 89 will also be of opposite polarity and the magnet 86 will attract the valve element 86 and move it upwardly into open position. However, if the magnet 86 is rotated about its axis for 180° as indicated by the arrow 90, then the pole 88 will be moved into line with the pole 85 and the pole 89 will be moved into line with the pole 84. Confronting poles of the valve element 83 and the magnet 86 are then of the same polarity with the result that they repel one another and the magnet 86 will force the valve element 83 downward into closed position.

Figure 7:
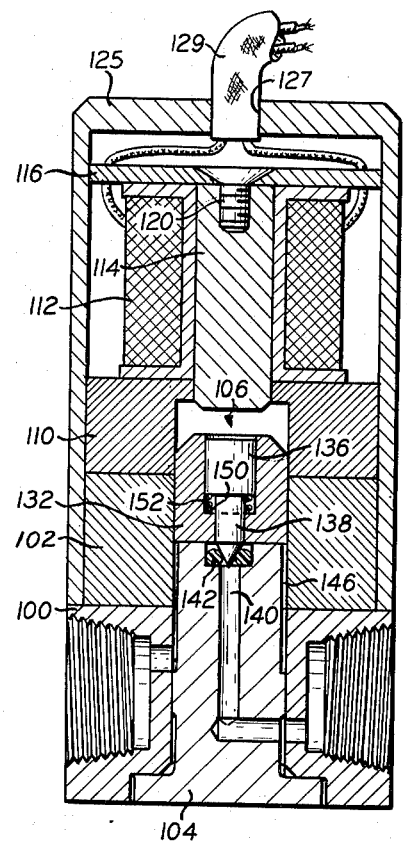
FIGURE 7 is a sectional view showing another modified form of the invention.

FIGURE 7 shows another modified form of the invention in which there is a housing 100 having its lower portion similar to the housing 10 previously described. However, the upper part of the housing 100 is somewhat different in that there is a bushing 102 which extends upwardly above the plug 104 which corresponds with the plug 26 of the construction in FIGURE 1. This plug 104 extends into the bushing 102 for a portion of the length of the bushing and the space within the bushing 102, beyond the end of the plug 104, constitutes a part of a valve chamber 106.

An upper part of the valve chamber 106 is in a bushing 110 which is preferably made of non ferrous metal. This bushing 110 is a spacer which locates a winding 112 some distance above the chamber 106.

There is a ferrous metal core 114 extending through the winding and into the upper end of the chamber 106. The bushing 110 fits over the core 114 with a press fit so that the core 114 and bushing 110 are an integral unit.

There is a ferrous metal bar 116 secured to the upper end of the core 114 by a fastening element such as a screw 120.

A ferrous metal shell 125 covers the assembly down to the lower housing 100; and there is an opening 127 in the top of the shell 125 for passage of conductors 129 which supply power to the winding 112. The shell 125 is preferably a press fit on the bushing 102 and the spacer bushing 110.

Within the valve chamber 106 there is a valve element that includes a ferrous metal ring 132 which slides up and down in the chamber 106 as a piston; but which has clearance around its circumference for the passage of fluid from the lower portion of the chamber into the upper portion and vice versa, depending upon the direction of movement of the ring 132.

The valve element includes also a center element 136 in the ring 132. This center element 136 and the ring 132 may be considered a thick disc with the cylindrical circumference serving as a bearing that slides on the inside surface of the chamber 106 and with sufficient clearance to permit passage of fluid from one side of the valve element to the other. A projection 138 extends from the center element 132 into an outlet passage 140 having an O-ring 142 in a counterbore at the upper end of the outlet passage.

The valve element of FIGURE 7 is moved into closed position and is held in closed position by the fluid pressure in the chamber 106 in the same way as already described in connection with FIGURE 1. When the valve element is to be moved into open position, the winding 112 is energized and the magnetic flux causes the ring 132 to rise into contact with the end of the core 114. This lifts the center element 136 from the O-ring 142 and opens the outlet passage 140 for flow of fluid from an annular inlet port 146, through the chamber 106, and out through the outlet port 140.

There is a shoulder 150 in the ring 132 spaced some distance below the bottom of the center element 132 when the parts are in the positions shown in FIGURE 7. This spacing permits the ring 132 to move independently of the center element during its initial movement and to strike the center element with impact, thus making possible the opening of the valve element with less power and a smaller winding 112.

In order to obtain this impact operation when the assembly is upside down, as compared to the position shown in FIGURE 7, a light compression spring 152 is placed between the shoulder 150 and the confronting bottom face of the center element 136. This spring holds the ring 132 and element 136 in the relation shown in FIGURE 7 whenever the valve element is in closed position regardless of the orientation of the assembly.

The preferred embodiments of the invention have been illustrated and described, but changes and other modifications can be made, and some features can be used in different combinations without departing from the invention as defined in the claims.

What is claimed is:

1. A valve including a housing having a bore extending axially thereof, a plug that fits into one end of the bore and that is shorter than the bore so as to leave space at the other end of the bore, said space serving as a valve chamber, an end wall at the other end of the bore closing said valve chamber, a fluid passage extending through the plug in an axial direction for at least a part of the length of the length of the plug, said passage opening into the chamber, a valve element in the chamber movable axially to close and open said passage, the plug having an end face of substantial radial extent surrounding said passage, and the valve element having a complementary face that confronts and is adjacent to the end face of the plug when the valve element is in position to close said passage, ports opening through a side wall of the bore at distances lengthwise of the bore, a reduced diameter end portion of the plug extending from one of said openings to the chamber end of the plug and providing a second passage opening into the valve chamber, and a cross passage in the plug from the axial passage in the plug to another reduced diameter portion of the plug that is axially spaced from the reduced diameter end portion and located at another of the openings through the wall of the bore.

2. The valve described in claim 1 characterized by a counterbore at the chamber end of the axial passage in the plug, an O-ring in the counterbore and a tapered extension of the valve element that extends into contact with the O-ring when the valve element is in closed position.

References Cited by the Examiner

UNITED STATES PATENTS

| 481,001 | 8/1892 | Case | 251—360 X |
| 2,307,723 | 1/1943 | Anderson | 251—141 X |
| 2,576,168 | 11/1951 | Allen | 251—65 X |
| 2,781,979 | 2/1957 | Kraft | 251—141 X |
| 3,038,487 | 6/1962 | Gardner | 251—363 X |
| 3,054,594 | 9/1962 | Hecht | 251—333 |
| 3,064,936 | 11/1962 | Strauss | 251—141 |

FOREIGN PATENTS

| 886,961 | 7/1943 | France. |
| 1,011,205 | 4/1952 | France. |
| 933,152 | 9/1955 | Germany. |
| 1,041,755 | 10/1958 | Germany. |

M. CARY NELSON, *Primary Examiner.*